United States Patent
Parkinson et al.

(10) Patent No.: US 11,436,364 B2
(45) Date of Patent: Sep. 6, 2022

(54) PRIVACY SCOUT

(71) Applicant: Allstate Insurance Company, Northbrook, IL (US)

(72) Inventors: John Parkinson, Wheaton, IL (US); Nicolette De Guia, Chicago, IL (US); Margaret K. Striebich, Chicago, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 241 days.

(21) Appl. No.: 16/229,312

(22) Filed: Dec. 21, 2018

(65) Prior Publication Data

US 2020/0202037 A1    Jun. 25, 2020

(51) Int. Cl.
*G06F 21/62*    (2013.01)

(52) U.S. Cl.
CPC ................. *G06F 21/6245* (2013.01)

(58) Field of Classification Search
CPC .................................................. G06F 21/6245
USPC .......................................................... 726/26
See application file for complete search history.

(56) References Cited

U.S. PATENT DOCUMENTS

| | | | |
|---|---|---|---|
| 7,966,400 B2 | 6/2011 | Brown et al. | |
| 8,312,273 B2 | 11/2012 | Nice et al. | |
| 8,566,726 B2 | 10/2013 | Dixon et al. | |
| 8,631,038 B2 | 1/2014 | Mellmer et al. | |
| 8,656,456 B2 | 2/2014 | Maxson et al. | |
| 8,825,888 B2 | 9/2014 | Schoen et al. | |
| 9,053,327 B2 | 6/2015 | Vandervort | |
| 9,934,542 B2 | 4/2018 | Chauhan et al. | |
| 9,942,276 B2 | 4/2018 | Sartor | |
| 10,440,022 B2 * | 10/2019 | Halligan | H04L 63/0407 |
| 10,474,836 B1 * | 11/2019 | Cieslak | H04L 63/101 |
| 2005/0102195 A1 * | 5/2005 | Kuehr-McLaren | G06Q 40/04 705/26.2 |
| 2006/0059225 A1 | 3/2006 | Stonehocker et al. | |
| 2010/0121773 A1 | 5/2010 | Currier et al. | |
| 2014/0331119 A1 | 11/2014 | Dixon et al. | |
| 2016/0164915 A1 * | 6/2016 | Cook | H04L 63/1483 726/1 |
| 2018/0182009 A1 | 6/2018 | Barday et al. | |

FOREIGN PATENT DOCUMENTS

CN    104301323 B    10/2017

OTHER PUBLICATIONS

Visualizing Lightbeam, <http://research.ecuad.ca/lightbeam/>, Dec. 21, 2018.

(Continued)

*Primary Examiner* — Jeffrey C Pwu
*Assistant Examiner* — Nega Woldemariam
(74) *Attorney, Agent, or Firm* — Brooks Kushman P.C.

(57) ABSTRACT

Methods, computer-readable media, software, and apparatuses may assist a consumer in keeping to their preferred privacy preferences when making a purchase online. Differences between the privacy policy of a vender and the privacy preferences of the consumer may be output for display to the consumer, along with alternative vendor recommendations, including vendors having privacy policies more closely match with the privacy preferences of the consumer.

15 Claims, 5 Drawing Sheets

(56) References Cited

OTHER PUBLICATIONS

Privacy Pal, <https://www.avira.com/en/avira-privacy-pal>, Dec. 21, 2018.
Privacy Policy, <https://www.optimizely.com/privacy/>, Dec. 21, 2018.
Ghostery, <https://extension.ghostery.com/intro#ghostery>, Dec. 21, 2018.
P3P: The Platform for Privacy Preferences, <http://www.w3.org/P3P/>, Dec. 21, 2018.
Privacy Bird, <http://www.privacyfinder.org/>, Dec. 21, 2018.
PrivacyPal, <http://www.privacypal.co>, printed Jun. 20, 2018.
Jan. 22, 2020—International Search Report & Written Opinion Appn PCT/US2019/061747.

* cited by examiner

PRIVACY SCOUT

FIELD OF ART

Aspects of the disclosure generally relate to methods and computer systems, including one or more computers particularly configured and/or executing computer software. More specifically, aspects of this disclosure relate to methods and systems for matching consumer privacy preferences with corporate online personal data practices.

BACKGROUND

Consumers commonly use the World Wide Web for locating and purchasing products and services. A consumer may use a web browser to visit a vendor's website for this purpose. While the website may make available a privacy policy disclosing the corporate online personal data practices of the vendor, the consumer may not easily locate the privacy policy. In addition, the vendor's privacy policy may be a lengthy document, and may be difficult to read on a small display screen, such as that of a mobile device. Furthermore, the privacy policy may be written in legal terms that the consumer may find difficult to fully understand. Although consumers may care about the privacy policy of a vendor, due to the difficulties discussed above, only the most motivated consumers may seek out and understand a vendor's privacy policy. This results in consumers interacting with vendors, without knowledge of the privacy policy of those vendors.

As consumers continue to make purchases in online environments, there will be an ever-present need to improve consumer awareness of the privacy policies of the vendors with which they interact, and to help consumers find vendors whose privacy policies meet the consumers' privacy preferences.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses to compare a consumer's privacy preference with a privacy policy of a vendor and, in some embodiments, to recommend alternative vendors having privacy policies more closely matching the consumer's privacy preferences. The recommended alternative vendors may be output for display to the consumer along with indications of various qualities of the vendors' privacy policies, and indications of how, or if, those qualities conform to, or lack conformance with, the consumer's privacy preferences. The described cyber-privacy system may help a consumer avoid interacting with vendors having privacy policies that don't match the consumer's preferences, and may help the consumer find other vendors whose privacy policies more closely match their privacy preferences.

In some aspects, the system may include at least one processor and a memory unit storing computer-executable instructions. The system may be configured to, in operation, store information about privacy policies of a number of vendors and/or websites. The system may also be configured to, in operation, compare privacy preferences of a consumer (also referred to herein as a user) with the privacy policy of a vendor identified in an online request, from the consumer, for a product or service. The system may be configured to, in operation, determine whether the privacy policy of the identified vendor meets the privacy preferences of the consumer. Based on a determination that the privacy policy is not compatible with the consumer's privacy preferences, the system may identify alternative vendors who provide similar products or services. The system may, in operation, respond to the consumer to indicate the alternative vendors and may also provide indications related to the privacy policies of the alternative vendors. Alternatively, based on a determination that the privacy policy is compatible with the consumer's privacy preferences, the system may send the request to the vendor, for example, without responding back to the consumer.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for matching consumer privacy preferences with corporate online personal data practices. A vendor, also referred to herein as an entity, may maintain a privacy policy that describes how a consumer's personal data is collected and shared, whether a consumer can opt in/out of the collection of data, and/or whether a consumer can delete the collected personal data, for example. Personal data may include information such as the consumer's name, address, age, telephone number, email address, and products/services searched for, among others.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
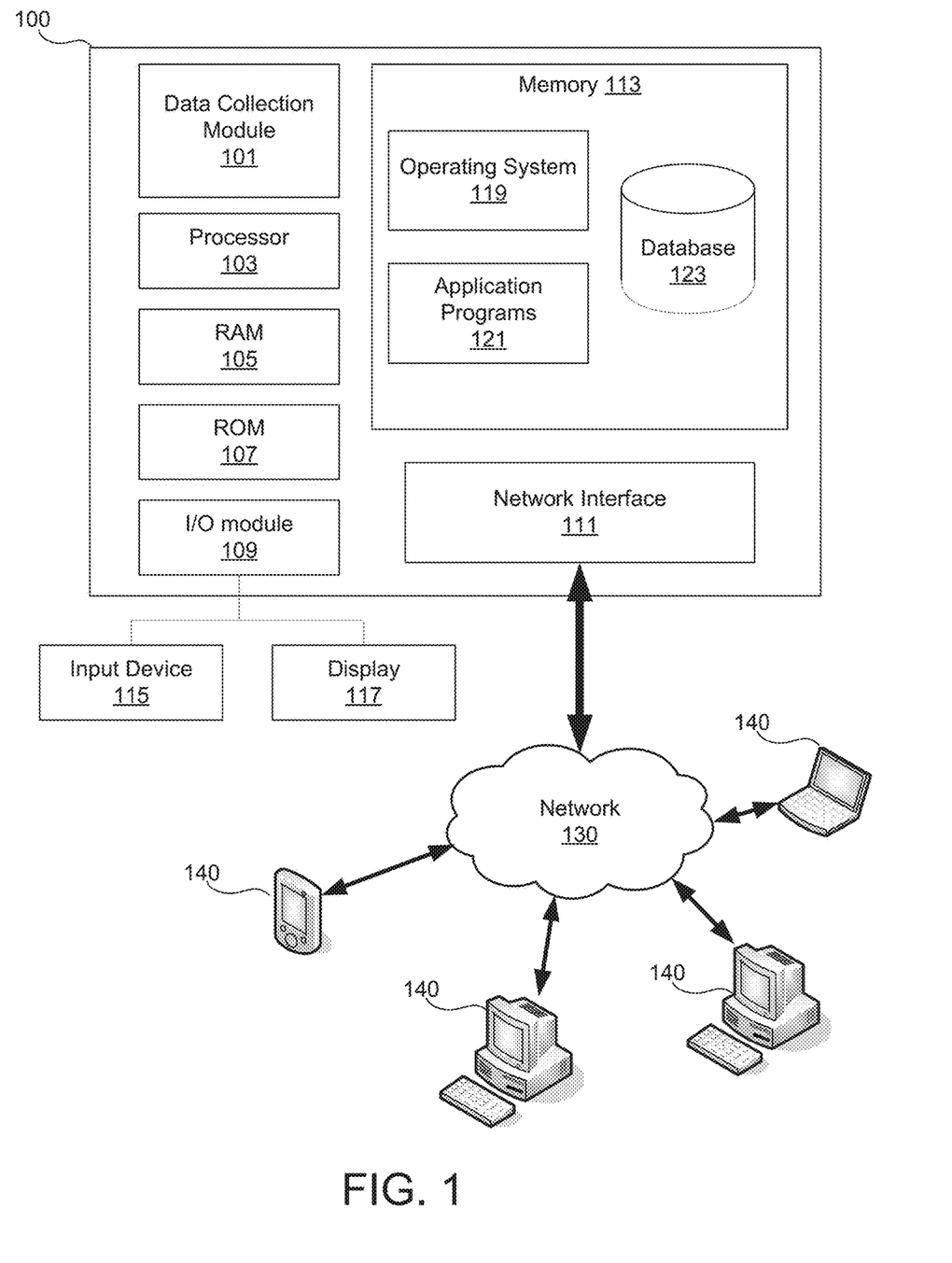
FIG. 1 illustrates an example cyber-privacy device that may be used in accordance with one or more aspects described herein.

In one or more arrangements, aspects of the present disclosure may be implemented with a computing device. FIG. 1 illustrates a block diagram of an example cyber-privacy device 100 that may be used in accordance with aspects described herein. The cyber-privacy device 100 may be a computing device, such as a personal computer (e.g., a desktop computer), server, laptop computer, notebook, tablet, smartphone, vehicles, home management devices, home security devices, smart appliances, etc. The cyber-privacy device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-privacy device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the cyber-privacy device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the cyber-privacy device 100 may provide input data. The I/O module 109 may also be configured to be connected to a display device 117, such as a monitor, television, touchscreen, etc., and may include a graphics card. The display device 117 and input device 115 are shown as separate elements from the cyber-privacy device 100; however, they may be within the same structure. On some cyber-privacy devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-privacy device 100 to perform various functions. For example, memory 113 may store software used by the cyber-privacy device 100, such as an operating system 119 and application programs 121, and may include an associated database 123.

The network interface 111 may allow the cyber-privacy device 100 to connect to and communicate with a network 130. The network 130 may be any type of network, including a local area network (LAN) and/or a wide area network (WAN), such as the Internet, a cellular network, or a satellite network. Through the network 130, the cyber-privacy device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-privacy device 100. In some embodiments the cyber-privacy device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
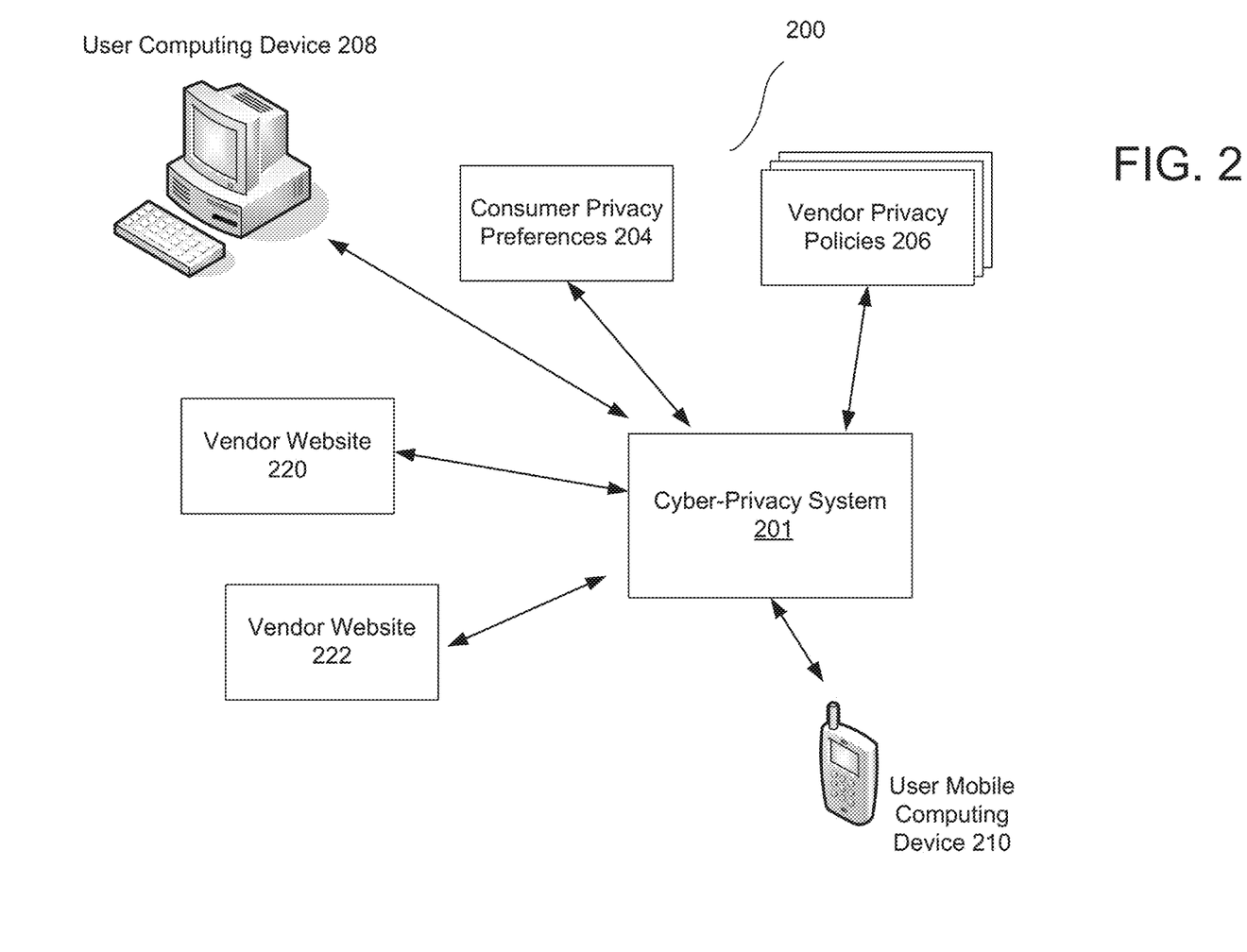
FIG. 2 shows a diagram illustrating the system architecture for a cyber-privacy system in accordance with one or more aspects described herein.

FIG. 2 shows a block diagram illustrating system architecture 200 for a cyber-privacy system. In some embodiments, the cyber-privacy system 201 may be implemented as part of a proxy server. In some other embodiments, the cyber-privacy system 201 may be implemented in a virtual private network (VPN) end point. In some embodiments, the cyber-privacy system 201 may be implemented as part of a cyber-security platform or as part of a digital safety framework. In some instances, the cyber-privacy system 201 may be a cyber-privacy device 100.

The cyber-privacy system 201 may collect information from, and transmit information to, a consumer through various different channels, such as via a user mobile computing device 210, or via a user computing device 208. In some embodiments, the cyber-privacy system 201 may receive a request from a consumer for a product or service and may transmit the request to a vendor identified by the request. For example, a consumer may use a web browser, or other application, on user computing device 208 to send a request to cyber-privacy system 201 for a product or service offered at vendor website 220. In some embodiments, the request may include a Uniform Resource Locator (URL) identifying the vendor website 220. In some embodiments, the request may include a request for content, such as a request for a web page comprising hypertext markup language (HTML), such as a website's home page. Upon receiving the request, cyber-privacy system 201 may compare the consumer privacy preferences 204 with vendor privacy policies 206, which may include a privacy policy associated with the vendor web site 220.

The consumer privacy preferences 204 may represent the privacy preferences of the consumer who sent the request. In some embodiments, the consumer privacy preferences 204 may be associated with the computing device sending the request, for example, user computing device 208. In some embodiments, the consumer privacy preferences 204 may have been previously stored by the cyber-privacy system 201, for example, in a local database. In other embodiments, the consumer privacy preferences 204 may be received by the cyber-privacy system 201 as part of the request sent by the consumer. In still other embodiments, the cyber-privacy system 201 may retrieve the consumer privacy preferences 204 from a computing device via a network, for example, after receiving the request from the consumer. In some embodiments, the cyber-privacy system 201 may be configured with artificial-intelligence capabilities to understand a consumer's preference based on consumer's usage over time.

The vendor privacy policies 206 may include privacy policies of one or more vendors. As noted above, the vendor privacy policies 206 may include the privacy policy associated with the vendor website 220. For example, the privacy policy associated with the vendor website 220 may have been previously stored by the cyber-privacy system 201, for example, in a local database. In some other embodiments, the privacy policy associated with the vendor website 220 may be retrieved from the vendor website 220, or from another location, for example, after receiving the request from the consumer. In various embodiments, the cyber-privacy system 201 may process or translate one or more vendor privacy policy into an internal format appropriate for comparing with the consumer's privacy preferences.

Upon determining that the privacy policy associated with the vendor website 220 matches, or is otherwise compatible with, the consumer privacy preferences 204, cyber-privacy system 201 may send the request to the vendor website 220.

Alternatively, the cyber-privacy system 201 may determine that the vendor privacy policy associated with the vendor website 220 does not match, or is not compatible with, the consumer privacy preferences 204, and if so, the cyber-privacy system 201 may respond to the request from the consumer by providing various indications to that effect. For example, the cyber-privacy system 201 may respond with an indication that the vendor privacy policy 206 associated with the vendor website 220 does not match the privacy preferences 204. The indication may include visual or audio indications, such as a warning message or symbol, for example.

In some embodiments, the cyber-privacy system 201 may determine one or more alternative vendors, such as vendor website 222, who may offer a similar product or service and, in these embodiments, the cyber-privacy system 201 may respond with indications of the alternative vendors. For example, the response may include information, which when displayed, provides visual indications of the alternative vendors. In some embodiments, the visual indications may include indications as to how closely the privacy policies of one or more alternative vendors matches the consumer privacy preferences 204.

In some embodiments, after responding with the indications of the alternative vendors, the cyber-privacy system 201 may receive a request from the consumer indicative of a selection of one of the alternative vendors. The cyber-privacy system 201 may subsequently send the request to the selected alternative vendor. In these embodiments, the cyber-privacy system 201 may remember, or otherwise record, the selection made by the consumer and, if a request identifying vendor website 220 is again received from the consumer, may automatically send, or offer to send, the request to the selected alternative vendor. In some embodiments, this automatic behavior may be available as a consumer-configurable feature. In some embodiments, automatic substitution may be prevented when the privacy policy of the vendor has changed subsequent to the previous visit.

In some embodiments, the consumer privacy preferences 204 may include information related to one or more privacy categories. The vendor privacy policies 206 may be compared to the consumer privacy preferences 204 by comparing information in each of the privacy categories. In some embodiments, the privacy categories may include categories generally related to data collection, data usage and data management. As an example, the consumer privacy preferences 204 may indicate that the consumer doesn't want collected personal data to be shared by the vendor. In another example, the consumer privacy preferences 204 may indicate that the consumer wants to be able to delete collected personal data stored by the vendor. In still another example, the consumer privacy preferences 204 may indicate that the consumer wants to be able to opt in, or opt out of, having their personal data collected by the vendor. The vendor privacy policy 206 may include information indicating the vendor's policy related to one or more of these privacy categories.

In order to be able to offer alternative vendors in response to a consumer's request, the cyber-privacy system 201 may store information of various vendors, their products, or services offered, and their privacy policies. In some embodiments, the information may be organized by product or service offered, in order to enable the cyber-privacy system 201 to identify vendors who may provide a product or service similar to one included in a request from a consumer. While this may represent one method for associating the vendor included in the consumer's request with alternative vendors, it should be understood that other methods may be used to accomplish the association. In some embodiments, the information may be stored in a database accessible by the cyber-privacy system 201.

In some embodiments, a database may be manually created, for example, and include information about larger or more popular retailers and their privacy policies. In other embodiments, the database may be constructed by automated means, for example, by scraping vendor websites to obtain privacy policies and information about products and services offered.

In some embodiments, information from vendor privacy policies may be processed to translate privacy policies of various vendors into a common ontology or vocabulary in order to facilitate comparing and interpreting the policies. In some embodiments, the cyber-privacy system 201 may include an ontology that organizes websites with similar purposes according to characteristics derived from privacy policies covering personal data items collected, permissible use for those data items, opt in and opt out options.

In each collection of similar websites or similar capabilities, websites may be ranked according to their privacy practices, for example, from most private to least private. Various definitions of the ranking process, which may have several dimensions, may be used. In some embodiments, the definitions may adjusted as privacy practices evolve. Initial definitions may include, but are not limited to: type/amount of data collected, a measure of extent of data sharing with third parties, a measure of the extent of monetization of consumers' data for any purpose, a measure of the difficulty for a consumer to opt in or out of data collection and data use, and a measure of the ease of deletion of data at a consumer's request.

In some embodiments, the cyber-privacy system 201 may store a consumer profile for one or more consumers that includes the consumers' privacy preferences. In these embodiments, the cyber-privacy system 201 may keep an account for each consumer and may identify the consumer when the consumer logs in or submits other identifying information. In other embodiments, the consumer privacy preferences may be received by the cyber-privacy system 201 when a consumer sends a request for a product or service. In such embodiments, the cyber-privacy system 201 may not need to maintain an account for each user.

In some embodiments, the cyber-privacy system 201 may output, for display to a consumer, an indication of the match between a website's privacy policy and the consumer's privacy preferences whenever the consumer visits a website, either automatically or upon request.

In some embodiments, the cyber-privacy system 201 may generate a visualization of alternative websites that are better matches with the consumer's privacy preferences. In some embodiments, the visualization may be generated using a variety of weighting algorithms and strength of match variables. In some embodiments, the visualization may place the consumer at the center of a circle or globe and may use distance from the center, spatial orientation, and/or color to indicate the closeness of the match between the consumer's privacy preferences and the website's privacy policy.

In some embodiments, the cyber-privacy system 201 may identify alternative vendors that are determined by the cyber-privacy system 201 to offer a closer match with the consumer's privacy preferences, for example, closer than the vendor website identified in the consumer's request. In some other embodiments, the cyber-privacy system 201 may present alternative vendors that are determined by the cyber-privacy system 201 to represent vendors most likely acceptable to the consumer, based on the consumer's privacy preferences.

In some embodiments, the cyber-privacy system 201 may track a consumer's online communications with various websites over time, for example, in order to gather a consumer's digital footprint. In some embodiments, the cyber-privacy system 201 may perform an analysis on the gathered digital footprint to assess alignment between the associated vendor privacy practices and a consumer's privacy preferences. In some embodiments, the analysis may be triggered based on a change in a consumer's privacy preferences. In other embodiments, the analysis may be triggered by a request, from a consumer, to do so. In some other embodiments, the analysis may be triggered based on an elapsed time since a previous analysis was performed. In some other embodiments, the analysis may be triggered by a change in one or more vendor privacy practices.

Figure 3:
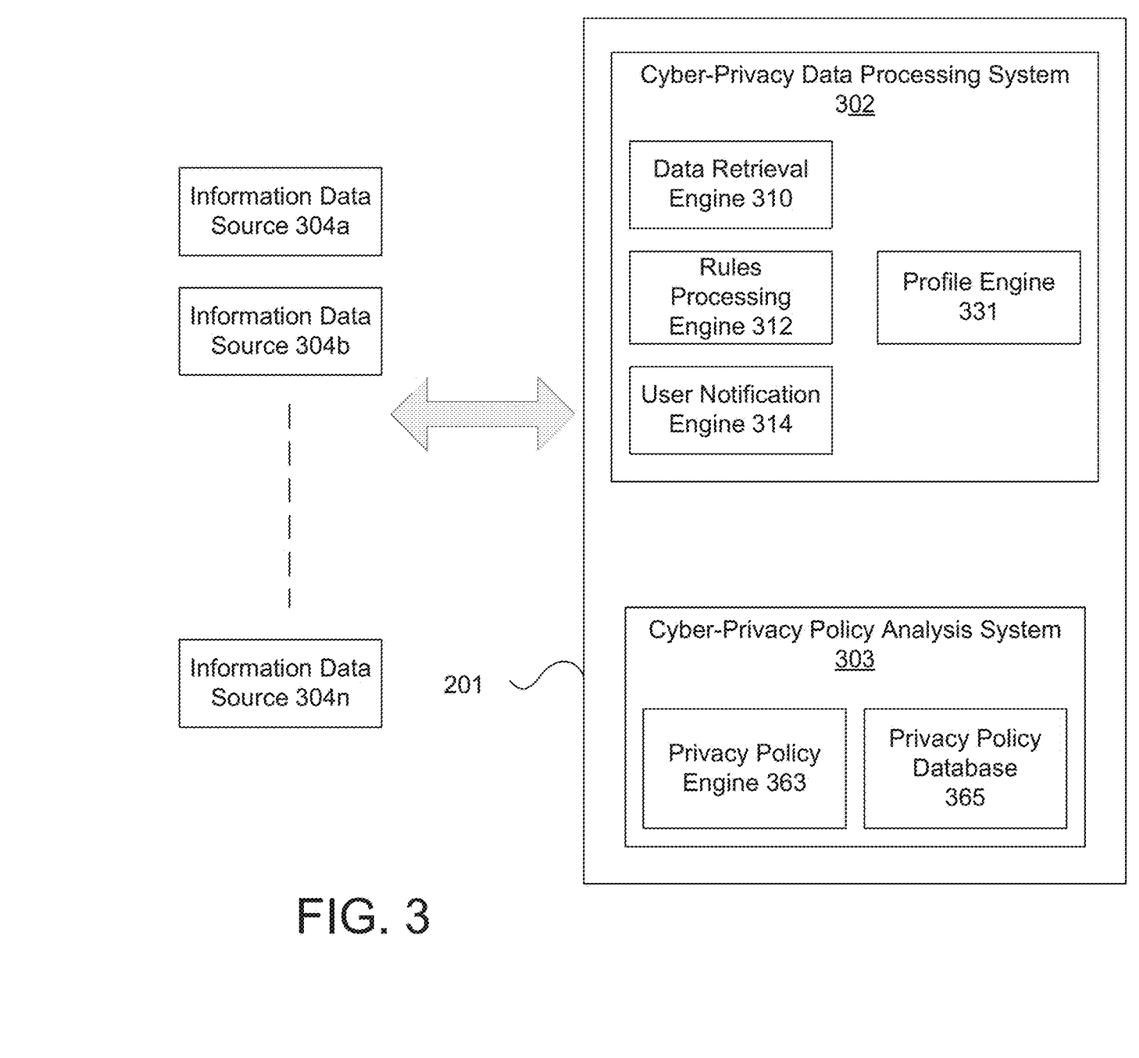
FIG. 3 illustrates a block diagram of a cyber-privacy system in accordance with one or more aspects described herein.

FIG. 3 illustrates a block diagram of particular portions of a cyber-privacy system 201. As shown in FIG. 3, the cyber-privacy system 201 may communicate with a plurality of information data sources 304a, 304b . . . 304n to collect information related to products and services offered by various vendors, and to collect information related to the privacy policies of the various vendors. In some embodiments, the information data sources 304a, 304b . . . 304n may include vendor website 220 and vendor website 222, illustrated in FIG. 2.

In some embodiments, the cyber-privacy system 201 may comprise a cyber-privacy data processing system 302 and a cyber-privacy privacy policy analysis system 303. The cyber-privacy data processing system 302 may retrieve information from the plurality of information data sources 304a-304n in order to determine the privacy policies of various vendors. The data retrieval engine 310 may be configured to monitor (for example, continuously monitor) each of the information data sources 304a-304n and report data of interest from any one of these data sources to the cyber-privacy system 201. For example, the data retrieval engine 310 may monitor a vendor website to determine if a privacy policy has changed. If a change is detected, the rules processing engine 312 may determine that related information should be passed on to the cyber-privacy policy analysis system 303 for analysis. In an embodiment, the cyber-privacy system may collect privacy policies from vendors that have been, or may be, utilized by consumers. In some embodiments, the user notification engine 314 may notify a consumer of a change in a privacy policy.

In an embodiment, cyber-privacy data processing system 302 may generate a consumer profile at profile engine 331. The consumer profile may be generated using at least in part data received and/or collected from information data sources 304-304n. The consumer profile may include details of the consumer, including but not limited to a consumer's name, age, address, driver's license number, credit card or bank information, insurance policies, networked devices associated with the consumer, and privacy preferences, etc. In an embodiment, the consumer may themselves enter additional or confirm information found in their consumer profile through a mobile application or computing device interface. Additional information that may be entered by the consumer includes financial account details and or verification of online accounts used by a consumer.

Privacy policies from numerous vendors may be fed into privacy policy engine 363 to determine information such as 1) what information is being collected from a consumer, 2) what the information of the consumer will be used for, and 3) whether the vendor will make the information available to third parties. Additional information that may be determined from the analyzed privacy policy may include, but is not limited to, consumer's rights and choices to access the data and make correction or deletion, rights or choices regarding data collection, how cookies are used, an organization's contact information, and the effective date of the policy. In some embodiments, the machine-learning algorithm may be trained based on a number of human-classified privacy policies.

In an embodiment, privacy policy engine 363 may include a conical data model and a supervised machine learning model for analyzing privacy policies. For instance, exemplary privacy policies may be tagged and used to build a classifier for analyzing subsequent privacy policies as typical privacy policies include sections of information discussing the various types of information being collated from a user, how such information may be used, and whether third parties will have access to the collected information. The added metadata to the exemplary privacy policies may be used by privacy policy engine 363 to identify information of interest in additional scanned privacy policies. In an embodiment, the output of privacy policy engine 363 may be stored in privacy policy database 365.

In an embodiment, privacy policy engine 363 may adjust the tagging scheme based on the accuracy of the results and the variability of the terminology used in different privacy policies. In another embodiment, privacy policy engine 363 may be used with different languages other than English.

In an embodiment, cyber-privacy privacy policy engine 363 may compare privacy policies of similar classifications of vendors (for example, vendors selling shoes, or vendors selling clothing, or vendors selling groceries). Such analysis may result in faster processing times of additional privacy policies, and may flag new additional provisions to be tagged. In an embodiment, additional information that privacy policy engine 363 may determine include data security information, compliance information, data retention information, and user control information.

In another embodiment, if privacy policy engine 363 does not find any data of interest in a privacy policy, a flag be set for further review of the privacy policy. The flag may be stored in privacy policy database 365.

Figure 4:
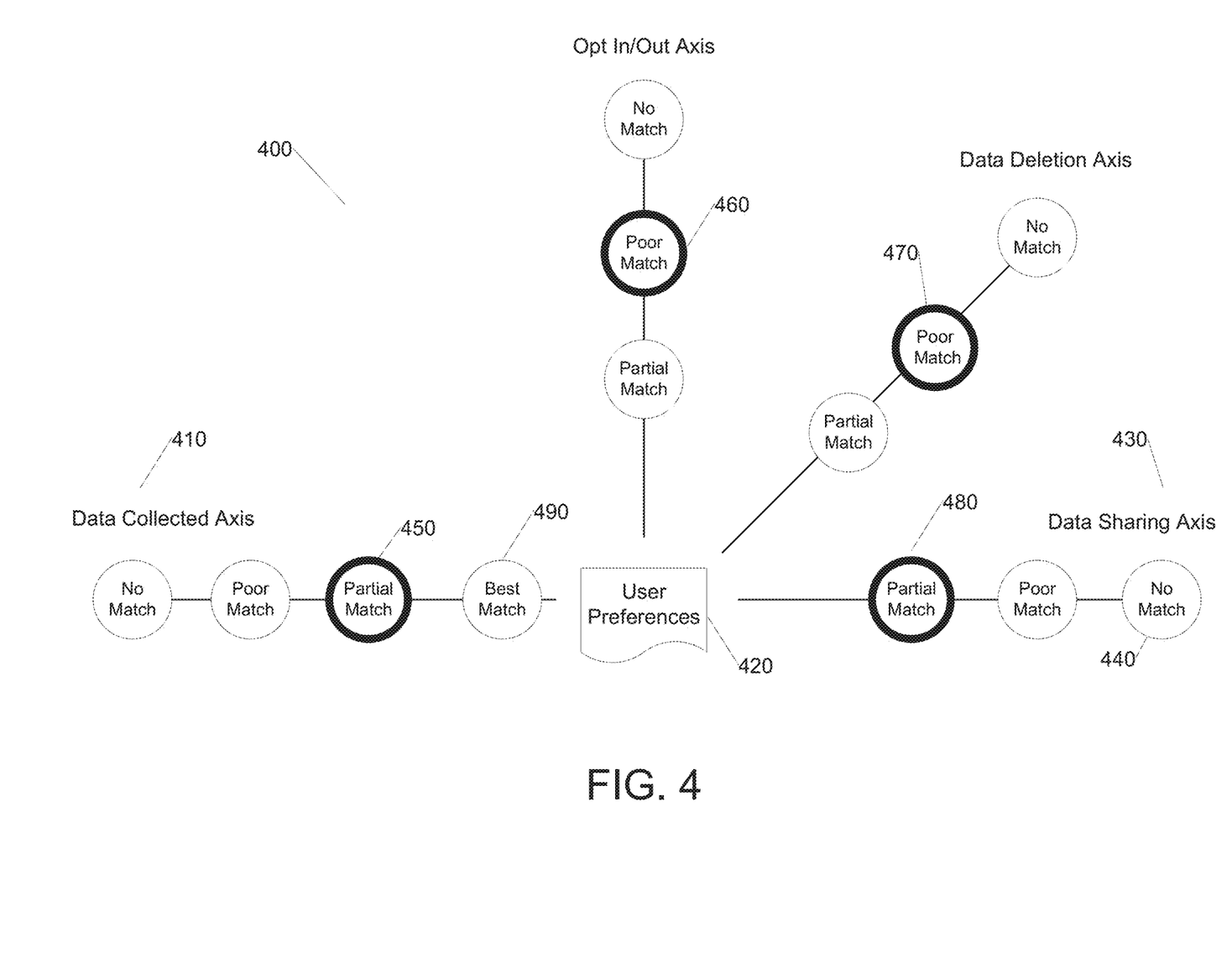
FIG. 4 illustrates an example user interface displaying indications of alternative vendors in accordance with one or more aspects described herein.

FIG. 4 illustrates an example user interface 400, as may be output for display to the consumer, presenting vendors providing a product or service similar to a product or service requested by the consumer. In some examples, user interface 400 may be displayed by user computing device 208, or user mobile computing device 210. It should be understood that the user interface of FIG. 4 is designed to illustrate various features and aspects of the user interfaces and the system, and not to limit the visual appearance or layout of the user interface.

In some embodiments, the user interface 400 may present representations of a number of vendors for a particular service or purchase so that a consumer may be able to select a vendor to fulfill a request. In some embodiments, grouping of services and/or purchase may also be represented by the user interface 400. In some embodiments, each vendor may be identified by a different color, hatching, shape, or shape outline, for example. Any other type of distinguishing marking may be used in the user interface to distinguish among vendors, according to the disclosure herein. In other embodiments, some vendors may share a same shape or marking while others may be uniquely identified, for example, to draw the consumer's attention. For example, a vendor having a privacy policy matching the consumer's privacy preferences may be marked in a unique way, so that the consumer will notice it. This is illustrated in FIG. 4 by the circles 450, 460, 470 and 480, which have a thicker outline than the other circles, and may correspond to a particular vendor.

As discussed above, the privacy policy of a vendor may include policies related to several privacy categories. For example, a privacy policy may include a category related to the type of data collected, a category related to opt in/opt out policies, a category related to data deletion practices, and a category related to data sharing practices. One or more of the privacy categories may be illustrated in the user interface using various means. For example, each privacy category may be shown as an axis or as an extending line on the user interface. While a limited number of axes have been depicted in FIG. 4, any number of axes may be realized in various embodiments.

As illustrated in FIG. 4, representations of each vendor may be placed along one or more of the privacy category axes to illustrate the relative compliance of the vendor privacy policy with the consumer's privacy preferences, in the corresponding privacy category. The position of the vendor representation on an axis may convey to the consumer the degree of compliance, or the relative compatibility, of that vendor's privacy policy with the corresponding category of the user privacy preferences.

For example, referring to the data collected axis 410, a vendor having a more closely matching privacy policy in this privacy category might be depicted by a circle closer to the user preferences 420 along this axis in the user interface. For example, circle 490 may correspond to a vendor having a privacy policy matching the consumer's privacy preferences regarding data collection. Vendors having privacy policies differing from the consumer's privacy preferences may be depicted farther from the user preferences 420 in the user interface. As an example, a vendor having a privacy policy not at all matching the user preferences in the data sharing category may be depicted by circle 440 at the end of a the data sharing axis 430, farthest from the user preferences 420.

In some embodiments, colors may be used to represent the degree of privacy policy match with the consumer's privacy preferences, in order to help the consumer distinguish between among vendors. For example, a poor match might be displayed with a red color while a good match may be displayed with a green color. In some embodiments, a degree of shading or hatching may correspond to a degree of match.

In some embodiments, when a consumer selects a circle corresponding to a particular vendor, the user interface may be changed such that all other circles associated with the same vendor may be marked in a unique way, thereby enabling the consumer to see how the selected vendor matches the consumer's privacy preferences in each of the privacy categories.

Continuing the example above, the vendor represented by the circles with the thicker outline has a privacy policy that is a partial match with the consumer's preferences in the data collected category, a poor match with the consumer's preferences in the opt in/out category, a poor match with the consumer's preferences in the data deletion category, and a partial match with the consumer's preferences in the data sharing category.

In some embodiments, the user interface may include a hover or select feature wherein, when the consumer hovers over, or selects, one of the objects, additional information may be displayed about the vendor or about the vendor's privacy policy. For example, a selection by a consumer of a particular object in the user interface may cause the system to display a summary of the privacy practices of a vendor and/or a link to the vendor's actual privacy policy details. This allows the consumer to get more information about the vendor privacy policy without having to visit the vendor's web site, where personal information may be collected by the website. In some embodiments, the user interface may provide a "select" feature that enables the user to select the object to cause the request to be sent to the selected vendor.

In some embodiments, one or more vendors may be represented with a privacy score, which may be a numeric value that indicates a degree of match with the consumer's privacy preferences. While the description herein assumes that a higher score reflects a better match with the consumer's privacy preferences, any algorithm for determining the value may be used. For example, the privacy score may comprise a value from 0 to 200, where an algorithm determines the value such that a higher value indicates a better match. In some instances, the privacy score may comprise an indication of a percentage match with the consumer's privacy preferences. For example, a value from 0 to 100 may be assigned, wherein the value 100 indicates a perfect match. In some embodiments, a consumer may be made aware of the score of a web site they have requested to go to, for example, in case the consumer would like to compare to scores of alternative vendors.

The user interface components depicted in user interface 400 are merely exemplary components, and any type of components that convey a degree of match may be used. In some embodiments, the components may be represented with shapes that correspond to their degree of match. For example, triangles or wedges may be sized in proportion to the degree of match between the consumer's privacy preferences and a vendor's privacy policy (for example, larger shapes corresponding to a better match than smaller shapes).

In some embodiments, the information presented in the user interface may allow the consumer to make an informed tradeoff between vendor website features and consumer privacy preferences.

As can be understood by referring to FIG. 4, consumers can quickly see what personal data vendor websites collect and what vendors may use their data for, allowing them to exercise options including avoiding vendor websites where the privacy policy does not match their privacy preferences. Consumers can be directed to vendor websites that most closely match their privacy preferences, and if no suitable vendor websites exist, make informed trade-off decisions between privacy and convenience.

Figure 5:
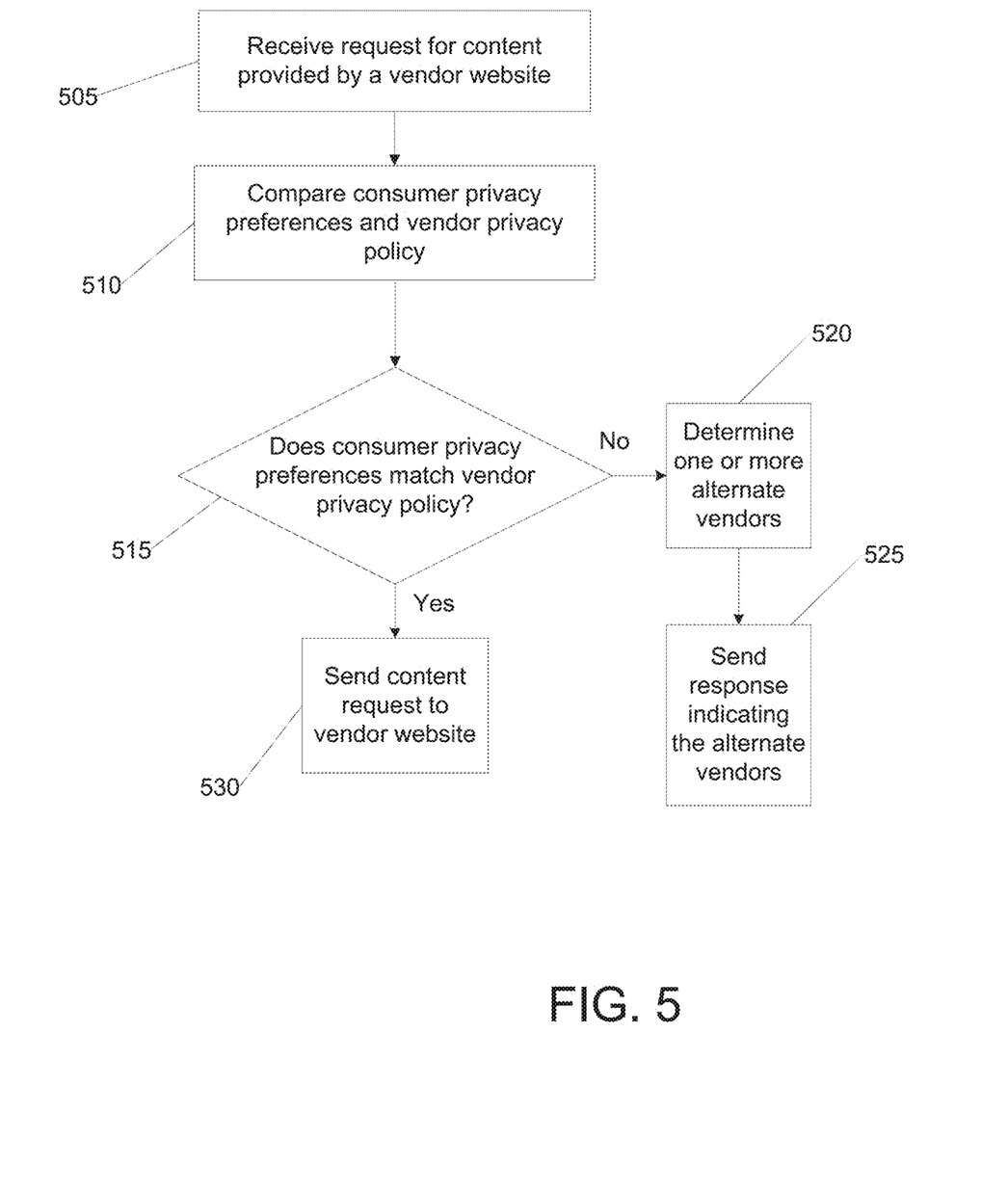
FIG. 5 illustrates an exemplary method for comparing a consumer's privacy preference with a privacy policy of a vendor and for recommending alternative vendors in accordance with one or more aspects described herein.

FIG. 5 depicts a method for assisting a consumer to be aware of a privacy policy of a requested vendor website and to offer the consumer alternative vendor websites in cases where the requested vendor's privacy policy is not a match with the consumer privacy preferences. The alternate websites may be displayed to the consumer along with indications conveying information about the privacy policies of the alternate vendor websites, as discussed above in relation to FIG. 4.

At step 505, cyber-privacy system 201 may receive a request for a product or service provided by a vendor website. In some embodiments, the request may include a request for content, such as a request for a website's HTML home page. The request may include URL.

At step 510, cyber-privacy system 201 may compare the consumer's privacy preferences with the vendor's privacy policy. The vendor's privacy policy and the consumer's privacy preferences may be made up of preferences and policies related to various privacy categories, as discussed above, such as data deletion policies, etc., and the cyber-privacy system 201 may compare the various categories of privacy policy in order to determine whether the privacy policy is a match with the consumer's privacy preferences.

At step 515, cyber-privacy system 201 may determine whether the privacy policy matches the consumer's privacy preferences. In an embodiment, cyber-privacy system 201 may determine that the privacy policy does not match the consumer's privacy preferences if any category of the privacy policy is not at least as private as the consumer preference related to that category.

If it is determined that the privacy policy matches the consumer's privacy preferences, cyber-privacy system 201, at step 530, may send the content request to the vendor website.

If it is determined that the privacy policy does not match the consumer's privacy preferences, cyber-privacy system 201, at step 520, may determine one or more alternate vendor websites.

At step 525, cyber-privacy system 201 may send a response indicating the alternate vendor websites, for example, to be presented as illustrated in FIG. 4.

In an embodiment, the cyber-privacy system 201 may offer several levels of protection against misalignment between vendors' privacy policies and consumer privacy preferences. For example, Level 1: basic safety—may inform the consumer of a vendor's privacy policy let the consumer decide if they want to proceed; remember their decision and apply the same actions on subsequent visits; Level 2: Improved safety—may offer alternatives that better align with consumer privacy preferences and guide the consumer to the best answer for what they are seeking. The system may remember their decision and remind them of their decision on subsequent visits; and Level 3: Optimal safety—Level 2 plus may block the consumer from visiting vendor websites with privacy scores below a predetermined value.

In some embodiments, the cyber-privacy system 201 may determine risk information (for example, a value and/or the information from which the value is derived) based on a consumer's privacy preferences and, in some embodiments, based on their actions taken when their privacy preferences do not match with a vendor's privacy policy.

A marketplace may be established for buying and selling risk information. For instance, an insurance marketplace may allow insurance providers to access risk information from the cyber-privacy system 201. Insurance providers and/or underwriters may establish insurance policies based on the risk information. For example, an insurance provider may offer an insurance policy to the consumer that protects against fraudulent transactions based on the risk information. If a consumer incurs financial damage as a result of a data breach (for example, the consumer is subjected to credit card fraud), the insurance policy may compensate the consumer for some or all financial losses incurred.

Premiums and/or deductibles for insurance policies may be established based on the risk information and/or value associated with a consumer. For example, a consumer with a high value may be charged a higher premium than a consumer with a low value.

In some instances, the risk information may be collected and used to determine behavioral patterns for a class of consumer. Over time, the cyber-privacy system 201 may determine the behavioral patterns based on actions taken by a consumer. For example, the cyber-privacy system 201 may determine that a consumer usually ignores the alternative vendors and continues to interact with a vendor having a privacy policy that does not match the consumer's privacy preferences.

In some instances, the determined, resultant behavioral data representing the behavioral patterns and/or the data used to determine behavioral patterns may be made available through the marketplace. A database of patterns may be made available detailing the risks associated with given behaviors. An insurer may pay to have access to a marketplace of the data, in order to better tailor insurance products for a consumer based on associated risk.

In some instances, access to the marketplace may be restricted and/or incur a fee. For example, a fee may be charged to access risk information collected by the cyber-privacy system 201. In some instances, the cyber-privacy system 201 may collect information from a variety of sources (e.g., credit monitoring services, identity theft protection services, consumer information protection services, etc.), and store the combined information in a database. In some instances, a separate fee may be charged for access to only a subset of the database information.

In an aspect of the disclosure, a cyber-privacy system 201 may be configured to, in operation, analyze the privacy policy for each institution, business, and/or vendor associated with a consumer determined from an email scan, browser history, and/or browser cache search. The cyber-privacy system may also analyze the on-line privacy policies of financial institutions and other businesses for which the consumer has an account based on information provided by an analysis of the consumer's profile. The determined information may be displayed to the consumer along with recommendations regarding personal data safety.

In an embodiment, a consumer device, such as user computing device 208, may include an application or a browser plugin, for example, that communicates with cyber-privacy system 201 to evaluate the privacy policy of a vendor before sending a request directly to the vendor web site.

In an embodiment, the features described herein may be offered to a consumer on a subscription basis and/or as part of an application providing other services.

In some embodiments, a consumer's privacy preferences related to the data sharing category may be organized into a data sharing agreement (DSA), and provided to a vendor with the understanding that the vendor must honor the DSA as a condition of maintaining a relationship with the consumer (for example, as a condition of doing business with the consumer). The DSA may document requirements related to selling data, sharing data, and using data, for example.

In some embodiments, the cyber-privacy system 201 may generate a consumer's DSA based on the consumer's privacy preferences.

In other embodiments, the cyber-privacy system 201 may provide any number of pre-prepared DSAs so that a consumer may conveniently choose a DSA having a preferred level of control over data sharing. For example, the cyber-privacy system 201 may provide a pre-prepared DSA that tightly controls or restricts data sharing, for example, as a cautious consumer might choose, and a pre-prepared DSA that allows data to be shared freely, as a less cautious consumer might choose.

In some other embodiments, the cyber-privacy system 201 may enable a consumer to configure a DSA, for example, a custom DSA, by enabling a consumer to select or otherwise specify various data sharing preferences for use in the DSA, such as whether data can be used, or not.

In some embodiments, the DSA may include rules that place conditions on whether data can be shared or sold. For example, the rules may specify that the data may be shared or sold if the consumer is compensated or awarded in some way, for example, with compensation above a determined value.

In some embodiments, the cyber-privacy system 201 may send a consumer's DSA to vendors determined to be associated with the consumer. For example, the cyber-privacy system 201 may provide a consumer's DSA to websites associated with the consumer's digital footprint. In some embodiments, the cyber-privacy system 201 may inform the consumer of the vendors determined to be associated with the consumer, and allow the consumer to choose whether or not to send the DSA to the vendors. For example, a listing of the vendors may be presented to the consumer, organized by vendor category (shopping, financial, social, internet, utilities, for example), and the consumer may be able to select or view vendors by category.

In some embodiments, after a vendor has been newly identified as being associated with a consumer, the cyber-privacy system 201 may automatically send the consumer's DSA to the newly identified vendor. In other embodiments, after identifying such a vendor, the cyber-privacy system 201 may simply notify the consumer, for example, by sending a message to the consumer, and leave it to the consumer to send, or cause the sending of, the DSA to the vendor.

In some embodiments, the cyber-privacy system 201 may monitor one or more vendors for changes in their privacy policies and, upon detecting a change in a privacy policy of a vendor, may act on behalf of consumers by sending, to the vendor, DSAs of one or more consumers known to be associated with that vendor. In some embodiments, the cyber-privacy system 201 may enable a consumer to opt in or opt out of this service. The cyber-privacy system 201 may notify consumers that the vendor privacy policy has changed and/or that their DSA has been sent to the vendor.

In some embodiments, the cyber-privacy system 201 may provide a consumer's DSA to a vendor when a consumer sends a request for a product or service from that vendor.

In some embodiments, a business operating the cyber-privacy system 201 may certify vendors who agree to honor and/or consistently honor consumers' DSAs. For example, the business may provide these vendors with a seal or other marking to display on their websites as an indication that they have been certified by the business. In these embodiments, the business may host information, such as a web page, about the certified vendors, for example, to enable consumers to easily find information about the vendors' data sharing policies, including consumer reviews, consumer ratings of the vendor, and other information.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. An apparatus, comprising:
a processor;
a memory unit storing computer-executable instructions, when executed by the processor, cause the apparatus to:
receive a content request identifying an entity and content provided by the entity;
compare a privacy preference of a user associated with the content request and a privacy policy of the entity; and
based on a determination that the privacy policy is not compatible with the privacy preference, determine one or more alternate entities for providing the content and send a response comprising, for at least one of the one or more alternate entities, an indication of a relative compatibility of a corresponding privacy policy with the privacy preference, wherein the indication of the relative compatibility comprises an indication associated with each of a plurality of privacy categories that include a data collected category, a data sharing category, an opt in/out category, and a data deletion category.

2. The apparatus of claim 1, wherein the content request comprises a Uniform Resource Locator (URL), and wherein the entity comprises a website identified by the URL.

3. The apparatus of claim 1, wherein the computer-executable instructions, when executed by the processor, further cause the apparatus to:
after sending the response indicating the one or more alternate entities for providing the content, receive a second request comprising a request for content provided by an alternate entity of the one or more alternate entities; and
send the second request to the alternate entity.

4. The apparatus of claim 1, wherein the computer-executable instructions, when executed by the processor, cause the apparatus to determine the one or more alternate entities for providing the content, by causing the apparatus to:

retrieve, from storage, indications of the one or more alternate entities, wherein the storage comprises an association between the entity and the one or more alternate entities.

5. The apparatus of claim 1, wherein the computer-executable instructions, when executed by the processor, further cause the apparatus to:

based on a determination that the privacy policy is compatible with the privacy preference, send the content request to the entity.

6. A method comprising:

receiving a content request identifying an entity and content provided by the entity;

comparing a privacy preference of a user associated with the content request and a privacy policy of the entity; and based on a determination that the privacy policy is not compatible with the privacy preference, determining one or more alternate entities for providing the content and sending a response comprising, for at least one of the one or more alternate entities, an indication of a relative compatibility of a corresponding privacy policy with the privacy preference, wherein the indication of the relative compatibility comprises an indication associated with each of a plurality of privacy categories that include a data collected category, a data sharing category, an opt in/out category, and a data deletion category.

7. The method of claim 6, wherein the content request comprises a Uniform Resource Locator (URL), and wherein the entity comprises a website identified by the URL.

8. The method of claim 6, further comprising:

after sending the response indicating the one or more alternate entities for providing the content, receiving a second request comprising a request for content provided by an alternate entity of the one or more alternate entities; and sending the second request to the alternate entity.

9. The method of claim 6, wherein the determining the one or more alternate entities for providing the content further comprises:

retrieving, from storage, indications of the one or more alternate entities, wherein the storage comprises an association between the entity and the one or more alternate entities.

10. The method of claim 6, further comprising:

based on a determination that the privacy policy is compatible with the privacy preference, sending the content request to the entity.

11. One or more non-transitory computer-readable media storing instructions that, when executed by a computing device, cause the computing device to:

receive a content request identifying an entity and content provided by the entity;

compare a privacy preference of a user associated with the content request and a privacy policy of the entity; and based on a determination that the privacy policy is not compatible with the privacy preference, determining one or more alternate entities for providing the content and sending a response comprising, for at least one of the one or more alternate entities, an indication of a relative compatibility of a corresponding privacy policy with the privacy preference, wherein the indication of the relative compatibility comprises an indication associated with each of a plurality of privacy categories that include a data collected category, a data sharing category, an opt in/out category, and a data deletion category.

12. The one or more non-transitory computer-readable media of claim 11, wherein the content request comprises a Uniform Resource Locator (URL), and wherein the entity comprises a website identified by the URL.

13. The one or more non-transitory computer-readable media of claim 11, storing further instructions that, when executed by the computing device, cause the computing device to:

after sending the response indicating the one or more alternate entities for providing the content, receive a second request comprising a request for content provided by an alternate entity of the one or more alternate entities; and send the second request to the alternate entity.

14. The one or more non-transitory computer-readable media of claim 11, storing further instructions that, when executed by the computing device, cause the computing device to determine the one or more alternate entities for providing the content, by causing the computing device to:

retrieve, from storage, indications of the one or more alternate entities, wherein the storage comprises an association between the entity and the one or more alternate entities.

15. The one or more non-transitory computer-readable media of claim 11, storing further instructions that, when executed by the computing device, cause the computing device to:

based on a determination that the privacy policy is compatible with the privacy preference, send the content request to the entity.

* * * * *